Sept. 27, 1960 W. CALDWELL Re. 24,879

ELECTRON TUBE THERMOELECTRIC GENERATOR

Original Filed Aug. 24, 1953

INVENTOR

Winston Caldwell,

BY Lloyd W. Patch

ATTORNEY

United States Patent Office

Re. 24,879
Reissued Sept. 27, 1960

24,879

METHOD AND APPARATUS FOR CONVERTING HEAT DIRECTLY INTO ELECTRICITY

Winston Caldwell, deceased, late of Nashville, Tenn., by Mary French Caldwell, administratrix, Nashville, Tenn.; said Winston Caldwell assignor of one-fourth to James J. Shanley, Bethesda, Md.

Original No. 2,759,112, dated Aug. 14, 1956, Ser. No. 375,881, Aug. 24, 1953. Application for reissue Aug. 13, 1958, Ser. No. 755,837

25 Claims. (Cl. 310—4)

Matter enclosed in heavy brackets [ ] appears in the original patent but forms no part of this reissue specification; matter printed in italics indicates the additions made by reissue.

My invention relates to an electron tube designed to convert heat directly into electricity, and particularly to a simple apparatus of this nature which is adapted to and can be used to generate and create a high voltage on commercially useful electric current.

An object of my invention is to provide a device of this character which is simple in construction and operation and which will act efficiently and economically to produce useable power.

Another object is to provide apparatus of this character which is relatively simple and inexpensive in its construction and installation; and which can be installed and used for a variety of uses and power requirements or purposes; and which when placed in use will operate efficiently and inexpensively substantially continuously or as desired, without interruption or requirement for repairs or services.

A further object is the provision of apparatus of this character to utilize large sources of what would otherwise be waste heat, such as heat obtained from solar energy, or from the flue gases of power plants, atomic installations or blast furnaces, or from the exhaust of jet engines and rocket missiles. In the case of waste heat from jet engines and rocket missiles, such apparatus can be used to operate the electrical equipment of the device.

With the above and other objects in view, some of which will be apparent to those skilled in the art and others of which are inherent in the construction and use of the parts, my invention relates to certain novel features of construction and combination and arrangement of parts which will be hereinafter described in connection with the drawings and then pointed out in the claims.

As has been stated, the drawings show two forms or constructions somewhat diagrammatically in which my invention can be embodied.

Figure 1:
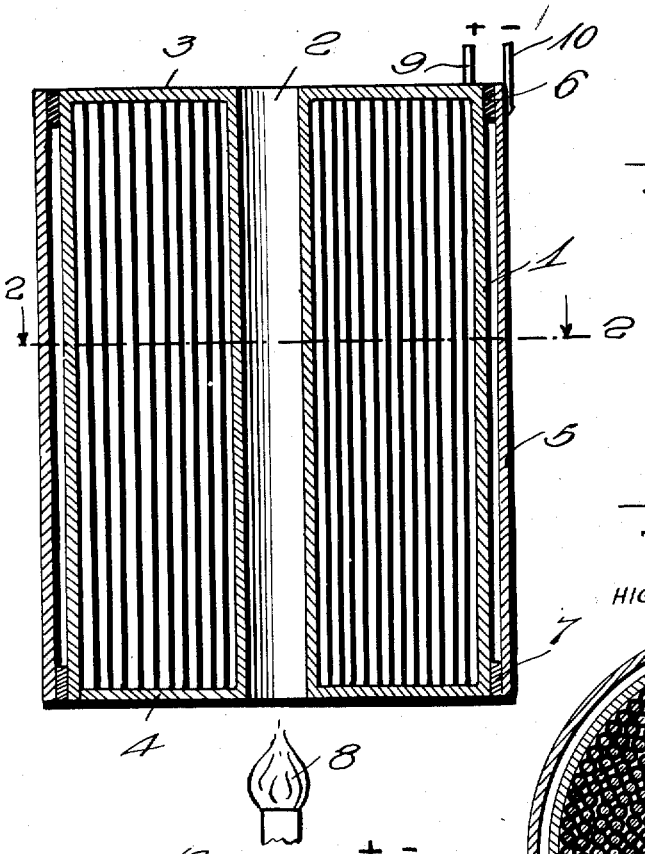
Figure 1 is a view somewhat in schematic section showing one embodiment of my invention.
Figure 2:
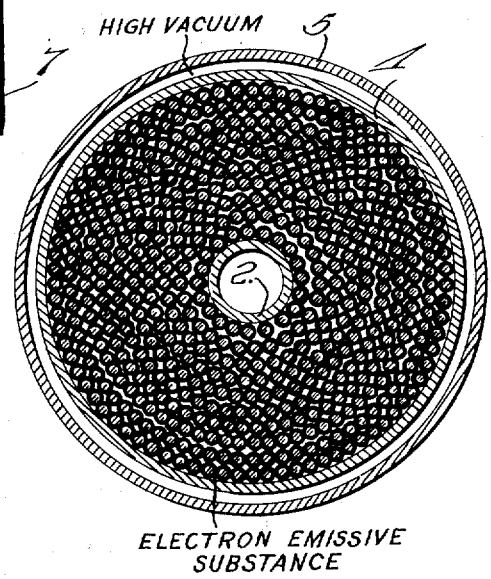
Fig. 2 is a transverse sectional view taken through the showing of Figure 1.

In the showing in Figures 1 and 2, the cathode structure is made generally cylindrical in form, having a side wall 1 and a central core or flue 2, both of which are connected together and closed at their ends by the top and bottom portions 3 and 4. This construction is made such that the cathode is substantially sealed throughout, and can be evacuated to any degree and extent desired.

A substantially cylindrical or tubular plate 5 is fitted around the wall 1 of the cathode in close proximity thereto, and is insulated from the cathode structure and is sealed by suitable end rings 6 and 7, the space around the cathode and within the plate 5 being thus separated only slightly and being exhausted to a high vacuum.

A commercially useful apparatus would be made with an overall diameter of 5 feet or more, and will be 10 feet to 20 feet tall, with the space between the cathode and the plate quite small, perhaps something like 2/100 of an inch or less. It is not believed that there is any inherent reason to prevent construction of the device of my invention in any other size that may be practical, except considerations of cost, weight, and other structural considerations. One practical consideration of the successful operation of my device is that the cathode and the plate shall be fairly large and the space between the cathode and the plate shall be quite small.

A burner 8 is disposed at the lower end of the core or flue to direct heat therethrough in such volume as may be necessary to heat the cathode structure to a red heat, or better, or to such heat as may be required for successful operation. This burner 8 can be a gas or oil fed type, and can be of such construction as may be necessary for the particular purpose desired. Fuel can be fed to the burner and can be controlled by various well known means, and no attempt is here made to disclose the same. Further, any type of hood or pipe or other exhaust means can be provided at the upper end of the core or flue 2, as may be necessary under the particular conditions of use.

In the present instance, I have shown the space between the core or flue 2 and the outer wall 1 of the cathode as closely packed or filled with a large number of lengths of fine gauge refractory insulated wire of fine gauge and coated with a refractory insulation or covering sufficient to withstand the heat which will be transmitted to the cathode structure from the core or flue. As has been stated, the interior of the cathode structure is evacuated to a degree possibly slightly less than a high vacuum. For greater efficiency, the outer surface of the wall of the cathode 1 is coated with material capable of emitting electrons.

As shown, the cathode and the plate structures are provided with negative and positive terminals, so that suitable connections can be made to power lines or other current conducting circuits as may be desired.

The base walls of the cathode and plate structure will be made of thickness and strength to meet requirements, and since it is desirable that the cathode be brought to a high heat and that the plate 5 remain cool, various expedients can be resorted to to insure that the plate will not overheat.

The efficiency of this construction may be increased by filling the interior of the cathode with some inert or other gas, and perhaps by using or supplying wires within the cathode, wires of various material which can be readily coated with an electron emitting oxide, for example nickel or nickel alloy. Further, it is possible that the wires may have a thin coating of barium-calcium-strontium oxide to serve as an insulation and an electron emitter. While I mention that the outer surface of the wall 1 of the cathode is coated with a material that will emit electrons, it can also be constructed of material which will emit electrons, such as thoriated tungsten. It is believed that a coating such as used in radio tubes would very likely prove best in use as it will emit electrons at a lower temperature.

The high vacuum space between the side wall of the cathode and the plate serves a dual purpose, one of which is to prevent injury to the electron emitting coating covering the cathode, and the other is to create a condition of minimum heat loss from the cathode.

In use, heat is applied to the cathode structure through the burner 8, while the plate 5 is maintained relatively cool, and as the cathode structure is heated the effect is to create current between the cathode and plate. The voltage will be increased by increasing the size of the apparatus.

Figure 3:
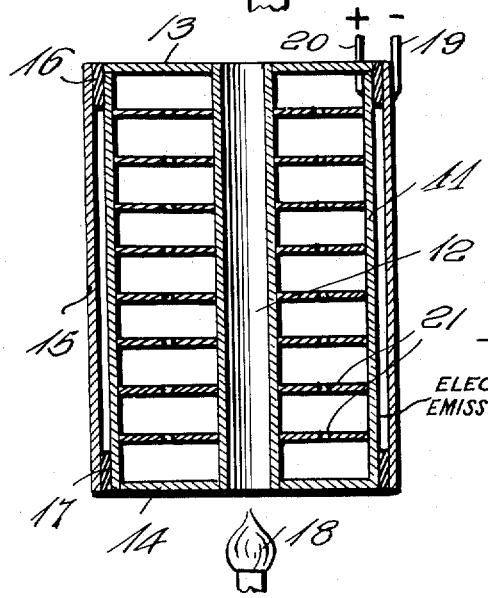
Fig. 3 is a view somewhat similar to Figure 1 showing another embodiment of my invention.

Figure 3 illustrates a modified construction in which the parts are somewhat similar, but are varied and modified to permit the interior of the cathode to be filled with gas or vapor or other suitable medium or material. In this modified construction, the cathode has an outer wall 11 with a core or flue 12, which are connected together as a vacuum sealed unit by top and bottom portions 13 and 14. A plate 15 is provided around the outer side of the cathode structure and is insulated therefrom by end rings 16 and 17. It is of course essential that the space between the outer side of the cathode and the inner side of the plate be vacuum sealed, and the surface of the cathode is preferably coated with a material capable of emitting electrons into this vacuum sealed space.

A burner is provided at 18 to conduct heat into and through the core or flue 12.

Negative and positive terminals 19 and 20 are provided for connection of suitable lines to draw the useable current as generated.

In this adaptation, a plurality of metal discs or rings 21 are provided in the interior of the cathode structure between the core or flue 12 and the outer wall 11, to assist in uniform heat transfer from the heating core. These discs or rings have openings therethrough permitting flow of gases within the cathode.

In use and operation the modified construction will be substantially the same as set forth in connection with the embodiment first described.

As various embodiments of my invention occur, it is possible that the wire as described in the first disclosed embodiment can be coiled or otherwise arranged within the cathode structure, and it is possible that there are pulverant or granular materials which can be used to fill the space within the cathode structure.

Obviously, where gases or vapors are used in the cathode structure, either alone or with some solid material, the pressures will be properly regulated and maintained.

While I have herein shown and described only certain specific embodiments of my invention, it will be apparent to those skilled in the art that many changes and variations can be made without departing from the spirit and scope of my invention.

I claim:

*1. Method of converting heat directly into electricity by a device including a cathode having a surface including electron emissive material closely spaced from the surface of a plate having an area substantially corresponding to the area of the surface including electron emissive material, which method comprises the steps of heating the cathode to a temperature higher than the electron emission temperature of the electron emissive material, maintaining the plate at a low temperature relative to the temperature of the cathode when heated to the high temperature to enhance the flow to the plate of electrons emitted from the electron emissive surface of the cathode, connecting power lines to the cathode and to the plate to develop a potential across the power lines as a function of the electrons collected by the plate, and establishing the area of the electron emissive surface of the cathode and heating the cathode to a predetermined high temperature to develop and maintain a desired potential across the power lines.*

*2. A device for converting heat directly into electricity, comprising a cathode and a plate, means for mounting the cathode relative to the plate with a portion of the cathode confronting and closely spaced from a portion of the plate, the last-named means including sealing means joined to the cathode and the plate in sealing relationship with the cathode and the plate and electrically insulating the cathode and the plate from each other, the sealing means and the cathode and the plate hermetically enclosing the space between the closely spaced portions of the cathode and the plate, the closely spaced portion of the cathode including electron emissive material, electrical connections from the cathode and the plate, and heating means for the cathode outside of the space between the closely spaced portions of the cathode and the plate.*

*3. A device as defined in claim 2 in which the heating means includes means for contacting the cathode with a hot fluid.*

*4. A device as defined in claim 2, in which the heating means includes means for contacting the cathode with a hot fluid under a pressure greater than the pressure in said space between said portions.*

*5. A device for converting heat directly into electricity, comprising a cathode having first and second extensive surfaces and a plate having first and second extensive surfaces, the first surfaces of the cathode and the plate confronting and being closely spaced from each other, the first surface of the cathode including a material which emits electrons when heated, sealing means joined to the cathode and the plate in sealing relationship with the cathode and the plate and electrically insulating the cathode and the plate from each other, the sealing means and the first surfaces of the cathode and plate hermetically enclosing the space between the first surfaces of the cathode and plate, the first and second surfaces of the cathode being sealed from each other by the plate and the sealing means and the material of the cathode, and the first and second surfaces of the plate being sealed from each other by the cathode and the sealing means and the material of the plate.*

*6. A device as defined in claim 5 including means for applying heat to the second surface of the cathode.*

*7. A device as defined in claim 5 including means for withdrawing heat from the second surface of the plate.*

*8. A device as defined in claim 5, including means for contacting the second surface of the cathode with a hot fluid.*

*9. A device as defined in claim 5 including means for contacting the second surface of the cathode with a hot fluid and means for withdrawing heat from the second surface of the plate.*

*10. A device as defined in claim 5 including means for contacting the second surface of the cathode with a hot fluid under a pressure greater than the pressure in the space between the first surfaces of the cathode and the plate.*

*11. A device for converting heat directly into electricity comprising a first elongated hollow member of electrical conducting material enclosing a second elongated hollow member of electrical conducting material with the external surface of the second hollow member in closely spaced relation with the internal surface of the first hollow member so that the opposing surfaces of the hollow elongated members define a space enclosing the second elongated hollow member and extending along the length of the second elongated hollow member, sealing means of electrically insulating material filling the space enclosing the second elongated hollow member at spaced regions along the length of the second elongated hollow member, the sealing means being sealingly joined to portions of the first elongated hollow member and the second elongated hollow member adjacent the spaced regions, the opposing surface of one of the hollow elongated members including electron emission material, electrical connectors joined to the first and second elongated hollow members, and means for heating the opposing surface of the one elongated hollow member.*

*12. A device as defined in claim 11 including means for removing heat from the opposing surface of the other elongated hollow member.*

*13. A device for converting heat directly into electricity comprising a plate structure and a cathode structure, the cathode structure including a surface of extensive area of electron emissive material, means for mounting the cathode structure and the plate structure in assembled*

*relationship with a surface of the plate structure of extensive area confronting and being in closely spaced relation with the surface of electron emissive material of the cathode structure, the plate structure and the cathode structure being insulated one from the other and having a vacuum therebetween, means to contact the cathode structure with a hot fluid to heat the cathode structure, and electrical connections from the cathode structure and the plate structure.*

*14. A device for converting heat directly into electricity as defined in claim 13 in which the plate structure includes a second surface in contact with a fluid under a pressure substantially greater than the pressure existing between the plate structure and the cathode structure, the second surface being opposite that surface of the plate structure which is in closely spaced relation with the surface of electron emissive material of the cathode structure.*

*15. A device for converting heat directly into electricity comprising a plate structure and a cathode structure, the cathode structure including a surface of extensive area of electron emissive material, means for mounting the cathode structure and the plate structure in assembled relationship with a surface of the plate structure of extensive area confronting and being in closely spaced relation with the surface of electron emissive material of the cathode structure, the areas of said confronting surfaces being substantially equal, the plate structure and the cathode structure being insulated one from the other and having a vacuum therebetween, means to contact the cathode structure with a hot fluid to heat the cathode structure, and electrical connections from the cathode structure and the plate structure.*

*16. A device for converting heat directly into electricity comprising a plate structure and a cathode structure, the cathode structure including a surface of extensive area of electron emissive material, means for mounting the cathode structure and the plate structure in assembled relationship with a surface of the plate structure of extensive area confronting and being in closely spaced relation with the surface of electron emissive material of the cathode structure, the plate structure and the cathode structure being insulated one from the other and having a vacuum therebetween, means to contact the cathode structure with a hot fluid to heat the cathode structure, means to remove heat from the plate structure, and electrical connections from the cathode structure and the plate structure.*

*17. A device for converting heat directly into electricity comprising a plate structure and a cathode structure, the cathode structure including a surface of extensive area of electron emissive material, means for mounting the cathode structure and the plate structure in assembled relationship with a surface of the plate structure of extensive area confronting and being in closely spaced relation with the surface of electron emissive material of the cathode structure, the areas of said confronting surfaces being substantially equal, the plate structure and the cathode structure being insulated one from the other and having a vacuum therebetween, means to contact the cathode structure with a hot fluid to heat the cathode structure, means to remove heat from the cathode structure, and electrical connections from the cathode structure and the plate structure.*

*18. A device for converting heat directly into electricity comprising a hollow cathode structure including a surface of extensive area of electron emissive material, an enclosing plate structure, the surface of electron emissive material on the cathode structure confronting and being in closely spaced relation with a surface of extensive area of the plate structure, the areas of said confronting surfaces being substantially equal, the cathode structure and enclosing plate structure being insulated one from the other and having a vacuum therebetween, means to apply heat to within the cathode structure, and electrical connections from the cathode structure and the plate structure.*

*19. A device for converting heat directly into electricity comprising a hollow cathode structure having a surface of extensive area of electron emissive material, an enclosing plate structure, the surface of electron emissive material of the cathode structure confronting and being in closely spaced relation with a surface of extensive area of the plate structure, the cathode structure and enclosing plate structure being insulated one from the other and having a vacuum therebetween, means to apply heat to within the cathode structure, means to remove heat from the anode structure, and electrical connections from the cathode structure and the plate structure.*

*20. A device for converting heat directly into electricity comprising a hollow cathode structure having a surface of extensive area of electron emissive material, an enclosing plate structure, the surface of electron emissive material of the cathode structure confronting and being in closely spaced relation with a surface of extensive area of the plate structure, the area of said confronting surfaces being substantially equal, the cathode structure and enclosing plate structure being insulated one from the other and having a vacuum therebetween, means to apply heat to within the cathode structure, means to remove heat from the plate structure, and electrical connections from the cathode structure and the plate structure.*

*21*[1]. An electron tube designed to convert heat directly into electricity comprising a cathode structure coated with material emitting electrons when heated, an enclosing plate structure, the coating on said cathode structure facing said plate structure, said cathode and enclosing plate structure being closely spaced and being insulated one from the other and having a vacuum therebetween, means to heat said cathode structure, and electrical connections from said cathode structure and said plate structure.

*22*[2]. An electron tube designed to convert heat directly into electricity comprising a hollow cathode structure closed and evacuated and containing a material generating electrons when heated, an enclosing plate structure, said cathode and enclosing plate structure being closely spaced apart on their side walls and being sealed and insulated one from the other and having a high vacuum therebetween, means to heat said cathode structure, and electrical connections from said cathode structure and said plate structure.

*23*[3]. An electron tube designed to convert heat directly into electric current comprising a hollow cathode structure of substantially cylindrical form having a hollow core through its center and being closed and sealed at top and bottom, said cathode structure containing a material which through transmission of heat from said core will generate electrons, a plate of generally cylindrical form surrounding the outer wall of said cathode structure and thermally and electrically insulated therefrom and having the space between the cathode and plate evacuated, means to impart heat to said cathode structure through said core, and electrical connections from said cathode structure and said plate structure.

*24*[4]. An electron tube designed to convert heat directly into electric current comprising a hollow cathode structure of substantially cylindrical form having a hollow core through its center and being closed and sealed at top and bottom, said cathode structure having its outer surface coated with a material which through transmission of heat from said core will generate electrons, a plate of generally cylindrical form surrounding the outer wall of said cathode structure and thermally and electrically insulated therefrom and having the space between the cathode and plate evacuated, means to impart heat to said cathode structure through said core, electrical connections from said cathode structure and said plate structure, and perforated metallic discs in said cathode structure intermediate the core and the outer wall to aid in heat transmission.

25[5]. An electron tube designed to convert heat directly into electric current comprising a hollow and substantially cylindrical cathode structure of considerable size having a flue extending through the middle thereof and with the top and bottom closed, the space within said cathode being closely packed with fine gauge wire coated with refractory insulation, a shell of only slightly larger diameter than the outside of said cathode fitted therearound and insulated electrically and thermally from said cathode, the space between the cathode and plate being relatively narrow and being evacuated, said cathode having the surface thereof facing the shell surfaced with a coating of material capable of emitting electrons when heated, positive and negative terminals on said cathode and shell, and heat supplying means at the lower end of said core or flue to heat the same and to bring the cathode structure to a high temperature while the thermally insulated plate remains relatively cool.

References Cited in the file of this patent or the original patent

UNITED STATES PATENTS

| | | |
|---|---|---|
| 2,437,576 | Wick | Mar. 9, 1948 |
| 2,510,397 | Hansell | June 6, 1950 |

FOREIGN PATENTS

| | | |
|---|---|---|
| 229,019 | Great Britain | Feb. 19, 1925 |